Figure 1:
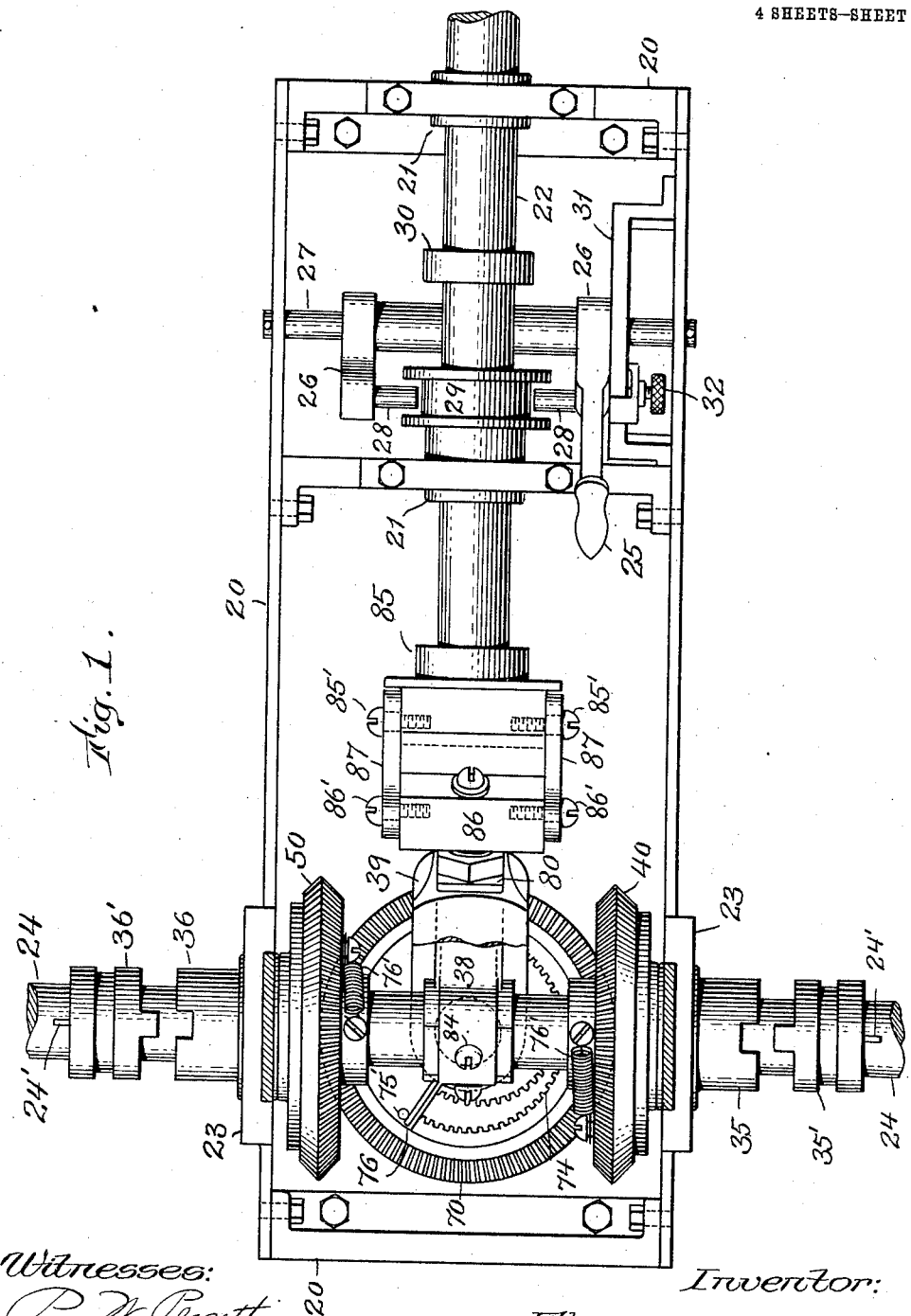

T. BICKFORD.
POWER TRANSMITTING MECHANISM.
APPLICATION FILED NOV. 13, 1909.

1,003,027.

Patented Sept. 12, 1911.
4 SHEETS—SHEET 1.

Witnesses:
P. W. Pezzetti
F. R. Armstone

Inventor:
Thomas Bickford,
by Wright Brown Quimby May
Attorneys.

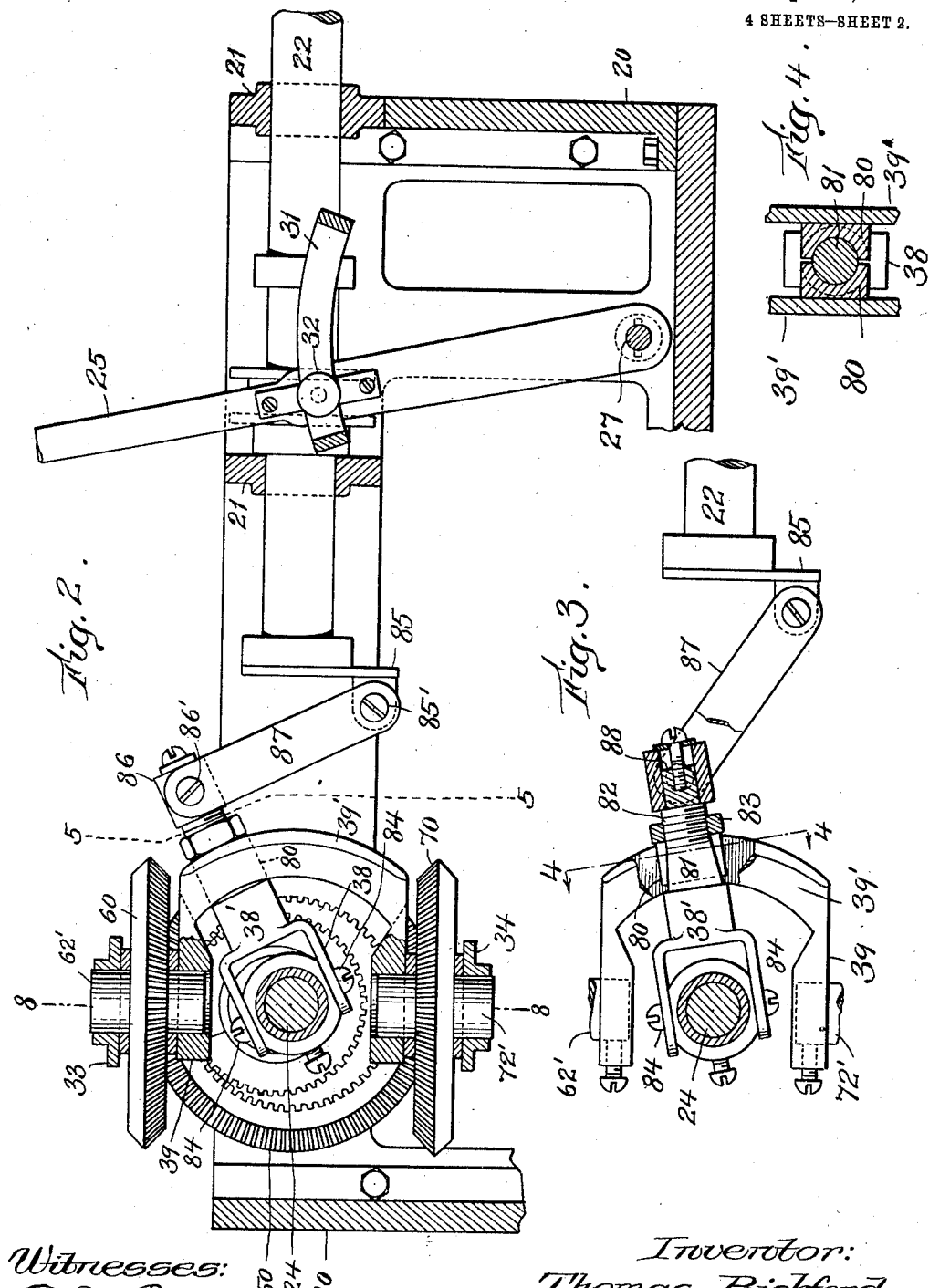

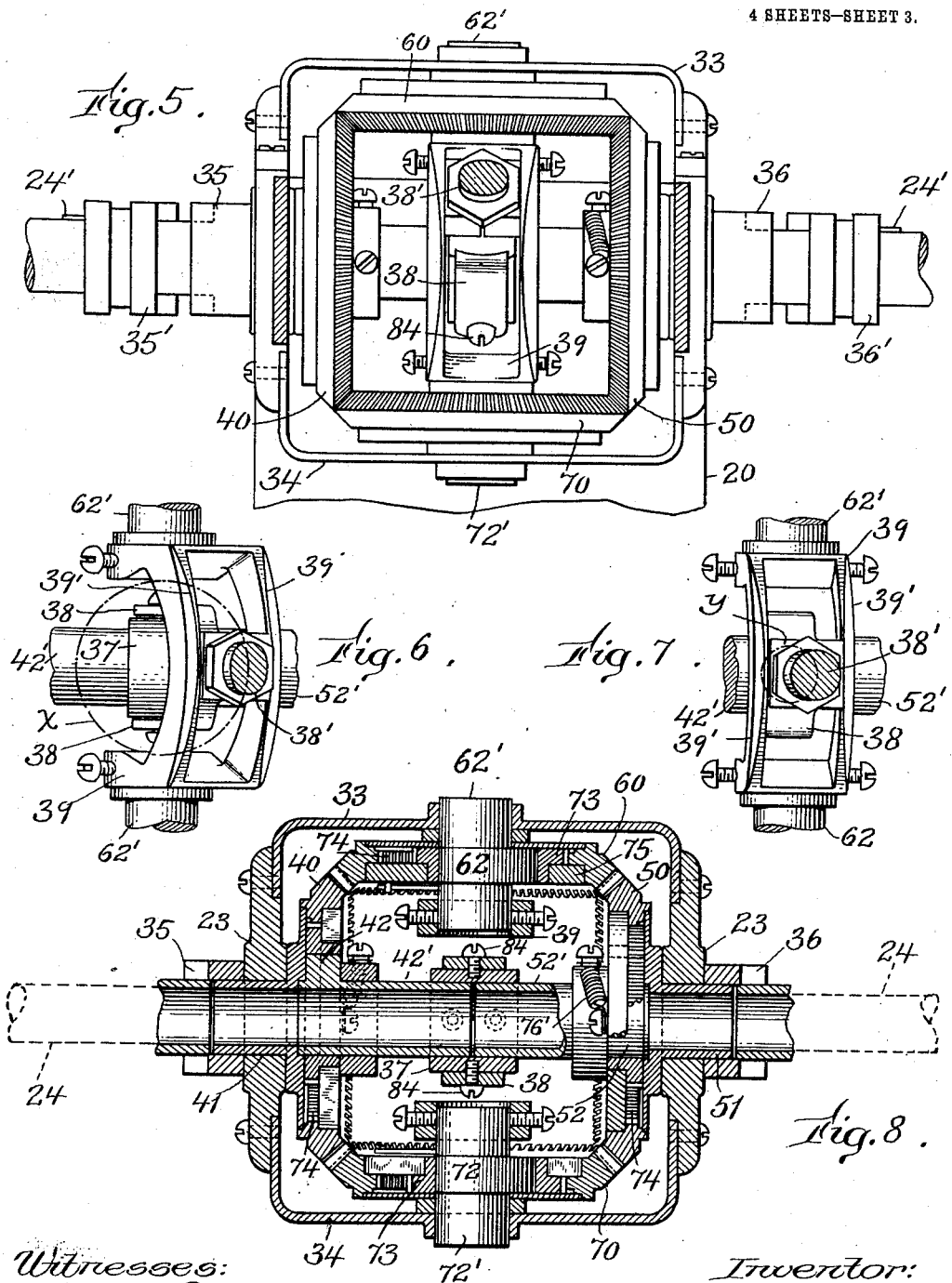

T. BICKFORD.
POWER TRANSMITTING MECHANISM.
APPLICATION FILED NOV. 13, 1909.
1,003,027.
Patented Sept. 12, 1911.
4 SHEETS—SHEET 4.
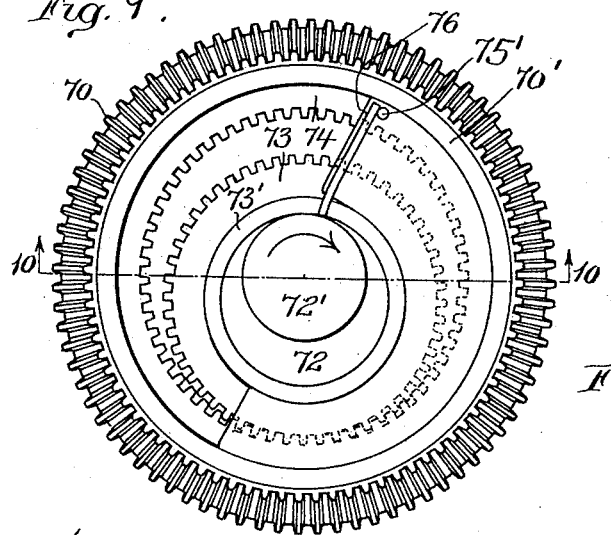
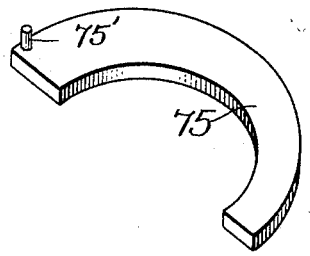
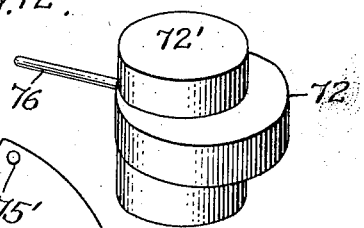
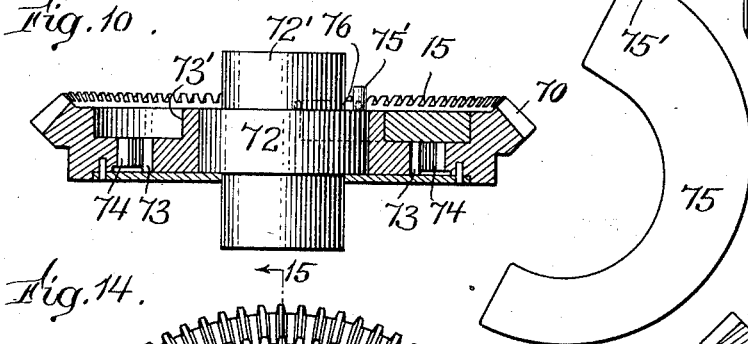
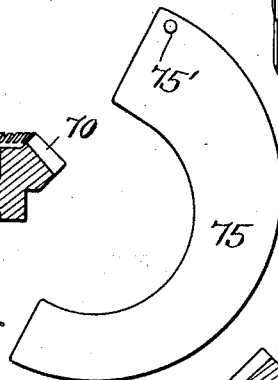
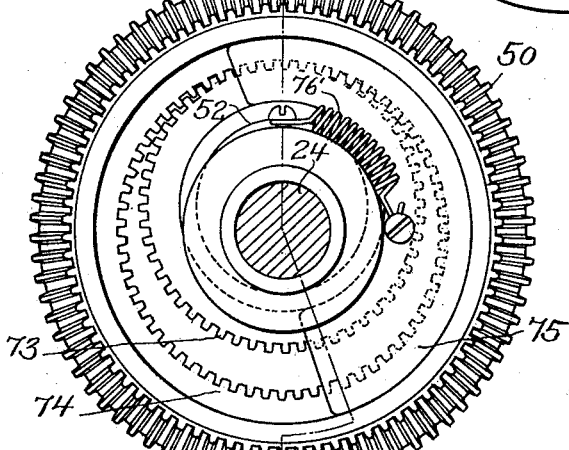
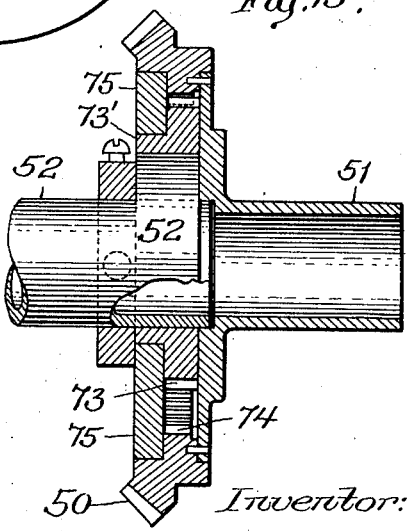
Witnesses:
Inventor:
Thomas Bickford,
by Wright Brown Quimby May
Attorneys.
COLUMBIA PLANOGRAPH CO., WASHINGTON, D. C.

UNITED STATES PATENT OFFICE.

THOMAS BICKFORD, OF BREWSTER, MASSACHUSETTS.

POWER-TRANSMITTING MECHANISM.

1,003,027. Specification of Letters Patent. Patented Sept. 12, 1911.

Application filed November 13, 1909. Serial No. 527,839.

*To all whom it may concern:*

Be it known that I, THOMAS BICKFORD, of Brewster, in the county of Barnstable and State of Massachusetts, have invented certain new and useful Improvements in Power-Transmitting Mechanisms, of which the following is a specification.

This invention relates to power-transmitting mechanism, and its object is to provide improved means for combining the movements of various parts to impart continuous movement to a driven member, and for varying the speed of movement of the driven member relatively to the speed of a driver whereby the speed of the ultimately rotated part may be varied from zero to maximum, while the driving element continues to rotate.

In carrying out the invention, the intermediate element for transmitting motion from the driving element to the driven element is formed and arranged so as to be oscillated and to transmit motion to the driven member in the form of continuous rotary motion. The intermediate element is adapted to be placed in various positions, while the driving element continues to rotate and to thereby vary the extent of oscillatory movement and to consequently vary the speed of rotation of the driven element. The mechanism for accomplishing this result is equally capable of converting continuous rotation or oscillation of the driving element into relation in one direction of the driven element. With regard to the use first stated in which the driving element is rotated continuously, it is proposed to employ the mechanism embodying the invention for purposes such as transmitting power from the motor to the driving wheels of a self-propelled vehicle, or from the motor to the propeller of a self-propelled boat, or from the driving shaft to the chuck of a lathe. When the mechanism is employed for any one of these purposes it is desirable to provide means for reversing the direction of rotation of the driven element and the form of invention herewith illustrated includes clutches whereby the oscillatory motion of the intermediate element may be caused to effect a rotation in either direction of the driven elements.

Another use to which the invention is adapted is hereinafter explained.

In the drawings which illustrate one form in which the invention may be embodied, Figure 1 represents a top plan view of power-transmitting mechanism including a driving shaft, a shaft to be driven and means for converting motion of the driving shaft into oscillatory motion and then into rotary motion whereby the shaft to be driven may be rotated in either direction, a top gear and its support being omitted. Fig. 2 represents a longitudinal vertical section of such mechanism. Fig. 3 represents a fragment of the intermediate reciprocatory element in another position. Fig. 4 represents a section on line 4—4 of Fig. 3. Fig. 5 represents a section on line 5—5 of Fig. 2. Figs. 6 and 7 represent a portion of the intermediate reciprocatory element in different positions as seen from line 5—5 of Fig. 2. Fig. 8 represents a section on line 8—8 of Fig. 2. Fig. 9 represents a gear and other component parts forming a part of the means for transmitting motion from the intermediate element to the shaft to be driven. Fig. 10 represents a section on line 10—10 of Fig. 9. Fig. 11 represents a perspective view of an oscillatory member carried by a gear shown in Fig. 9. Fig. 12 represents a perspective view of an oscillatory eccentric which coöperates with the member shown by Fig. 11. Fig. 13 represents an elevation of the member shown by Fig. 11. Fig. 14 represents a view similar to Fig. 9 including other equivalent devices. Fig. 15 represents a section on line 15—15 of Fig. 14.

The same reference characters indicate the same parts wherever they occur.

Referring first to Figs. 1 and 2, a frame or supporting structure is indicated at 20, the said frame being provided with bearings 21, 21, for a driving shaft 22, and with bearings 23, 23, through which extends a shaft 24, to which it is desired to impart rotary motion. For the purpose of description it may be presumed that the shaft 22 is rotated continuously in one direction and that it is adapted to be moved longitudinally in its bearings 21. The purpose of providing for longitudinal movement of the driving shaft is to employ the longitudinal movement for varying the speed of the driven shaft 24 as hereinafter explained. Any appropriate means may be provided for so moving the shaft, but the means herewith illustrated includes a hand lever 25 formed upon a yoke 26, which is adapted to rock upon a rod or shaft 27 mounted in the frame 20. The yoke bestraddles the shaft 22 and is provided with studs 28 which extend into a groove formed in the periphery of a sleeve 29 fixed upon the shaft. The sleeve is adapted to engage one of the bearings 21 and limit longitudinal movement of the shaft in one direction, and a collar 30 likewise affixed to the shaft is adapted to engage the other bearing 21 and limit longitudinal movement in the other direction. A sector 31 may be provided for holding the yoke in any position and 32 represents a clamp carried by the yoke and adapted to coöperate with the sector for this purpose.

The shaft 24 is preferably mounted in the hubs or sleeves of other rotating parts as shown by Fig. 8, instead of being mounted directly in the bearings 23. The hubs or sleeves referred to are provided for supporting a pair of miter gears 40 and 50, said hubs being indicated respectively at 41 and 51. The two sides of the frame which furnishes the bearings 23 are joined by cross pieces 33, 34, respectively, above and below the shaft 24. These cross pieces furnish stationary bearings for means which support miter gears 60 and 70 which are continuously intermeshed with the gears 40 and 50, and which coöperate therewith to form a rectangle of gears. The hubs of the gears 40 and 50 are provided with clutch members 35 and 36 which are adapted to coöperate respectively with other clutch members 35' and 36' mounted upon the shaft 24 and connected thereto by splines 24'.

Before proceeding to a detailed description of the various parts, it may be stated that each of the gears 40, 50, 60 and 70 becomes in turn an active member and that rotation of one is imparted equally to all of the others. It therefore follows that when any one of said gears is driven, rotation may be transmitted to the shaft 24, provided one of the clutch couples is connected. When it is stated that the gears 40, 50, 60 and 70 are driven in turn, it is not meant that one ceases to be driven when another begins to be driven, but, as will be understood by a later explanation, the period of driving action of one gear overlaps that of the previous gear and of the succeeding gear, so that there is never any instant of time when the gears are not driven. There is one exception to the foregoing statement and that prevails when the intermediate element is so positioned as to reduce the speed of the driven element to zero.

Within each of the gears 40, 50, 60 and 70 is an eccentric, the eccentrics being indicated respectively at 42, 52, 62 and 72, all of said eccentrics being contained within the circles of the gear teeth. The eccentrics 42 and 52 are formed upon sleeves 42' and 52', which surround and bear upon the shaft 24. The eccentrics 62 and 72 are formed with stub shafts 62' and 72', by which they are mounted in the frame pieces 33 and 34. The sleeves 42' and 52' are connected by a coupling piece 37, to which is pivotally connected, by screws 84, a lever 38. The inner ends of the stub shafts are connected by a lever 39, said lever being rigidly attached to the stub shafts as shown by Fig. 6. Oscillatory motion of the lever 38 about the axis of the sleeves 42', 52' imparts oscillation to said sleeves equally and oscillation of the lever 39 about the axis of the stub shaft 62', 72' imparts oscillation to said stub shafts equally. The lever 38 is provided with a wrist or projection 38', said wrist extending through the space between parallel straps 39' which connect the ends of the lever 39. That portion of the lever 38' which extends between the straps 39' is provided with a block 80, which is adapted to slide upon the straps 39'. For the purpose of insuring an accurate sliding fit of the block, it is formed in two pieces as shown by Figs. 3 and 4 and that part of the wrist upon which it bears is provided with a frusto-conical portion 81. Beyond the frusto-conical portion, the wrist is formed with a screw-thread 82 and provided with a nut 38, whereby the desired adjustment of the block 80 may be secured to insure a sliding fit.

It is apparent that the wrist 38' when oscillated in one plane may impart oscillation to the sleeves 42' and 52' and that when oscillated in a transverse plane about its pivots 84 it may impart oscillation to the lever 39 and consequently to the stub shafts 62', 72'. In operation the outer end of the wrist is given a circular motion, the diameter of which may be varied. Fig. 6 illustrates the arrangement by which the outer end of the wrist may be swung through a relatively large circle indicated by the line x and Fig. 7 illustrates the arrangement by which it is swung in a relatively small circle indicated by the line y. It is apparent now that when the wrist is so actuated both of the levers 38 and 39 are oscillated, but one is midway between its limits of movement when the other is changing direction at its limit of movement. Figs. 1, 2 and 3 illustrate one means by which the outer end of the wrist may be rotated. In said figures, 85 represents a crank disk fixed to the driving shaft 22. 86 represents a block swiveled at the free end of the wrist 38'. The swiveled block and crank disk are connected by a yoke or link 87, which is pivotally connected at 85' and 86'. The connecting yoke or link is made sufficiently strong to withstand and transmit the torque of the driving shaft to the wrist and the connections are so arranged that the wrist may be moved from a position in alinement with the shaft 22 to a maximum angular position with relation to said shaft. A relatively great angular position of the wrist is shown by Figs. 2, 5 and 6 and a relatively acute angular position is shown by Figs. 3 and 7. When the shaft 22 is moved toward the wrist, the angle of the wrist is increased so that the stud 88 may move in a relatively large circle, but when the shaft 22 is moved away from the wrist, the angle of the wrist becomes more and more acute, the circle in which the stud travels continually decreasing until the stud moves into line with the shaft. When the wrist is in the latter position rotation of the shaft 22 is of no effect other than rotating the block 86 about wrist stud 88 upon which it is mounted.

The means for transmitting motion from the levers 38 and 39 to the gears 40, 50, 60 and 70 is similar in all of the gears and a description of the mechanism associated with one of said gears will serve for all. The only exception to this statement is that the eccentrics 42 and 52 are formed upon sleeves, whereas the eccentrics 62 and 72 are formed upon solid stub shafts instead of sleeves.

Figs. 9 and 10 illustrate a gear including an eccentric formed upon a stub shaft and for the purpose of description it may be assumed that this is the gear 70 and that the stub shaft is that indicated at 72'. The eccentric 72 is a bearing for a spur gear 73, said spur gear being free to revolve upon the eccentric. The spur gear is contained within the circle of the miter gear 70 and is held continually in intermeshed relation with an internal gear 74, affixed to the miter gear. The axis of the stub shaft 72' is concentric with relation to the miter gear and the internal gear, whereas the axis of the spur gear 73 is concentric with relation to the eccentric 72, and therefore eccentric with relation to the internal gear. It therefore follows that when the stub shaft is oscillated, the spur gear will roll upon the teeth of the internal gear. This oscillation of the spur gear is employed to drive the internal gear intermittently in one direction. The spur gear is formed with a hub 73', whose periphery is concentric with relation to its bearing upon the eccentric 72. 74 represents a segmental block or wedge, whose inner face is of the same curvature as the exterior of the hub 73', and whose outer face is of the same curvature as the inner face of a flange 70' formed within the gear 70. The block 75 is interposed between the flange 70' and the hub 73' and has continuous contact with both the flange and the hub throughout its length. It may, however, be stated, that the member 75 is not limited to this segmental form and that it may with equal result be formed as a circular disk which would have a sliding fit with the flange 70' and an eccentric aperture adapted to receive the hub 73'. The manner in which the member 75 serves its purpose is to follow the hub 73' when the latter is oscillated in one direction and to therefore be in a position to oppose oscillation of the hub in the opposite direction. The result, when the member 75 is placed so as to oppose oscillation of the hub 73', is to constitute a stop interposed between the hub and the flange 70', whereby the oscillation of the hub is transmitted directly to the gear 70. For the purpose of sliding the member 75 so that it may follow the hub 73' the stub shaft is provided with a finger 76 which lies behind a pin or projection 75' affixed to the member 75. Now therefore when the stub shaft is oscillated in the direction of the arrow, the gear 73 rolls upon the gear 74, the hub 73' moves eccentrically with relation to the gear 70 and the member 75 is carried with the gear 73 because of the engagement of the finger 76 with the pin 75. The various parts when moving in this direction have no effect in driving the gear 70 because they have merely a rolling or sliding contact as the case may be. When, however, the stub shaft is oscillated in the opposite direction, the hub 73' is opposed by the member 75 and the result is that the oscillation of the hub is imparted positively to the gear 70, thereby oscillating the gear in one direction. When the stub shaft again moves in the direction of the arrow the member 75 is again moved relatively to the gear 70, so that it may be in position to immediately drive the gear 70 when the oscillation of the stub shaft is again reversed. In other words the stop member 75 is advanced step by step with relation to the gear 70 and it transmits one half of the oscillations of the hub 73' to the gear 70.

Referring now to Figs. 14 and 15, which illustrate the gear 50, and its operating parts, it will be seen that a spring 76' is provided for connecting the hub of the eccentric 52 with the stop member 75. The function of the spring is precisely the same as the function of the finger 76 and pin 75' with the additional feature that the elasticity of the spring is adapted to entirely eliminate the loss of motion which might otherwise occur between the eccentric and the driven gear.

Having thus explained one of the four similar coöperative elements for converting oscillatory motion of an eccentric into intermittent rotary motion in one direction, it will be necessary to describe the arrangement of the four similar elements whereby intermittent rotation at four separate points may be combined to effect continuous rotation of the driven shaft 24. To begin with, the parts contained in the gear 40 are arranged to drive said gear when the parts contained within the gear 50 are rolling or sliding freely within the latter gear. In other words, the gears 40 and 50 are so timed as to be active during periods which are 180 degrees apart with reference to the cycle of operations. A similar relation prevails with regard to the gears 60 and 70, but the latter pair of gears is timed to operate intermediately with relation to the first pair. The result of this arrangement is that the four gears become active in turn and the period of activity of each begins before that of the previous gear ends, and continues after that of the succeeding gear begins. In this way continuous motion is imparted to the gears and it remains only to couple them with the shaft 24, in order to drive said shaft. By reason of the arrangement of the gears 40 and 50 they are driven oppositely with relation to each other, and the shaft 24 may therefore be driven in either direction by setting either of the clutch members 35' or 36' in operative position.

The form and arrangement herein illustrated is adapted to be used when the motive power is continuous, but it is apparent that one of the four similar miter gear units with its operating parts is adapted to be used separately for the purpose of converting oscillatory motion into intermittent rotary motion in one direction. One use to which this part of the invention is adapted is that of a wrench such as a pipe wrench or socket wrench.

For the purpose of classifying the three elements of the invention as herein described, it may be stated that the shaft 22 is the driving element, the gears 40, 50, 60 and 70 are the driven elements and that the means for transmitting motion from the shaft to the gears is the intermediate element.

In operation, the outer end of the wrist 38' is given a movement in a curved path which, if the shaft 22 is completely rotated, will be a circular path. The structure of the two levers 38, 39, and their described connections is such that said motion of the wrist oscillates the sleeves 42', 52' and stub shafts 62', 72', and the eccentrics carried thereby; and the movements of these oscillating members act through the clutch devices comprising the spur gears, internal gears, and blocks 75, to impart rotary motion to the intermeshing gears, one after the other, or in sequence, and consequently the driven member (the shaft 24) is continuously actuated in one direction. Obviously, however, if the shaft 22 were to be given an oscillatory motion, that is, a motion in alternately opposite directions, the movement of the outer end of the wrist 38' would still be in a curved path, although perhaps less than half a circle, and would actuate both levers 38, 39 to impart rotation in one direction to the driven shaft 24 in the same manner as above described. Practically, the wrist 38', the lever 38, which carries it, and the coupling or sleeve 37 to which the lever 38 is pivotally connected by the screws 84, constitutes a universally pivoted arm, which is swung in a curved path by means of the shaft 22 and the link 87. As said universally pivoted arm swings, it actuates both sets of oscillating members which are employed to impart uni-directional movement of rotation to the driven member. And since the longitudinal adjustment of the shaft 22 provides for variably swinging the universally pivoted arm, that is, swinging it in a curve or circle of greater or lesser radius, the amount of rotation imparted by each swing may be varied and consequently the speed of movement of the driven member may be controlled.

Having thus explained the nature of my invention and described a way of constructing and using the same, although without attempting to set forth all of the forms in which it may be made or all of the modes of its use, what I claim is:—

1. A power-transmitting mechanism comprising a universally pivoted arm, a plurality of oscillatory members mounted to swing about different axes and mounted to be actuated by said arm, means for swinging said arm, and means for obtaining rotary movement from said oscillating members.

2. A power-transmitting mechanism comprising a driving member, a driven member, oscillatory members having their axes of movement at an angle to one another and actuated by the driving member, and mechanism connecting said oscillatory members and the driven member, said mechanism including clutch members for moving the driven member in one direction only.

3. A power-transmitting mechanism comprising a plurality of gears meshing together, a plurality of oscillating members mounted to swing in different planes, clutch connections between said gears and oscillating members, and a member movable in a curved path and having connections with the oscillatory members to actuate them simultaneously.

4. A power-transmitting mechanism comprising a plurality of gears meshing together, a plurality of oscillating members mounted to swing in different planes, clutch connections between said gears and oscillating members, and a member movable in a curved path and having connections with the oscillatory members to actuate them simultaneously, means being provided for varying the radius of the arc of movement of said actuating member.

5. A power-transmitting mechanism comprising a set of four rotary members at an angle to each other and in continuous geared connection, two oscillatory members having their axes of oscillation at a right angle to each other, clutch devices for transmitting motion from said oscillatory members to said rotary members, and means for variably actuating the oscillatory members.

6. A mechanical movement comprising a driving member, a driven member and power-transmitting means including a universally pivoted wrist connected to said driving member to be moved in a conoidal path, a pair of members movable about axes transverse one to the other and connected to said wrist to be oscillated thereby, and means actuated by said members and adapted to impart rotation in one direction to the driven member.

7. A mechanical movement comprising a driving member, a driven member, and power-transmitting means including a pair of members movable about axes intersecting at an angle of ninety degrees, means connected to the driving member for oscillating said members, and means actuated by said members for imparting rotation to said driven member.

8. A mechanical movement comprising four gears arranged at right angles upon intersecting axes, a driving member, and power-transmitting means for intermittently driving each of said gears in turn to impart continuous rotation to said gears.

9. A mechanical movement comprising four rotatable members arranged on axes intersecting at an angle of ninety degrees, a driving member, oscillatory means engaging said rotatable members and adapted to drive each rotatable member intermittently in one direction, and means connected to said driving member for oscillating said oscillatory means.

10. A power-transmitting mechanism comprising four intermeshing gears relatively arranged as a rectangle, a pair of oscillatory levers mounted within the rectangle and interengaged, clutch devices between said levers and gears, one of said levers having a wrist, and means for swinging said wrist.

11. A power-transmitting mechanism comprising intermeshing gears arranged in an endless train about a common center and in pairs, the two gears of each pair being diametrically opposite each other, interengaged levers, one for each pair of gears, said levers being mounted within the train of gears, clutch devices between each lever and its associated gears, a jointed member for swinging said levers, a rotatable driving member, and means connecting said driving member and said jointed member, said means being constructed and arranged to swing the latter, and to increase and decrease the distance of the jointed member relatively to the axis of the driving member.

In testimony whereof I have affixed my signature, in presence of two witnesses.

THOMAS BICKFORD.

Witnesses:
W. P. ABELL,
P. W. PEZZETTI.

Copies of this patent may be obtained for five cents each, by addressing the "Commissioner of Patents, Washington, D. C."